US006385451B1

(12) United States Patent
Kalliokulju et al.

(10) Patent No.: US 6,385,451 B1
(45) Date of Patent: May 7, 2002

(54) HANDOVER BETWEEN MOBILE COMMUNICATION NETWORKS

(75) Inventors: Juha Kalliokulju, Vesilahti; Matti Turunen, Tampere, both of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/394,951

(22) Filed: Sep. 13, 1999

(30) Foreign Application Priority Data

Sep. 14, 1998 (FI) ................................................. 981979

(51) Int. Cl.[7] ............................................... H04Q 7/20
(52) U.S. Cl. ....................... 455/437; 455/422; 455/426; 455/435; 455/436; 455/439; 370/331; 370/332
(58) Field of Search ................................. 455/436, 437, 455/438, 439, 426, 422, 435; 370/331, 332

(56) References Cited

U.S. PATENT DOCUMENTS

| 5,175,758 A | 12/1992 | Levanto et al. ............... 379/57 |
| 5,345,448 A | 9/1994 | Keskitalo ................... 370/95.3 |

(List continued on next page.)

FOREIGN PATENT DOCUMENTS

EP          0 804 006 A3       10/1997

OTHER PUBLICATIONS

"Resource ReSerVation Protocol (RSVP)—Version 1 functional Specification", Braden et al., RFC 2205, Sep. 1997.
Finnish Official Action.

*Primary Examiner*—Daniel Hunter
*Assistant Examiner*—Yemane Woldetatios
(74) *Attorney, Agent, or Firm*—Perman & Green, LLP (57) ABSTRACT

The invention relates to a method for handing over a connection between a first (NW1) and a second mobile communication network (NW2) in a wireless terminal (MS1). In the method, at least one data transmission connection is established for the purpose of transmitting information between the wireless terminal (MS1) and one said mobile communication network (NW1, NW2). In the first mobile communication network, the connection type is either connection-oriented (HSCSD) or connectionless (GPRS), and in the second mobile communication network (NW1, NW2), at least two traffic classes with different transmission features are defined and one of them is selected for the data transmission connection of the second mobile communication network (NW1, NW2). In the method, it is also examined what active data transmission connections the wireless terminal (MS1) has to the mobile communication network (NW1, NW2) handing over the connection. When handing over a connection from the first mobile communication network (NW1) to the second mobile communication network (NW2), the connection type of each active data transmission connection is examined, the traffic class corresponding to each active data transmission connection type is defined in the second mobile communication network (NW2), and a connection according to the defined traffic class is established for each data transmission connection in the second mobile communication network (NW2). When handing over a connection from the second mobile communication network (NW2) to the first communication network (NW1) the traffic class of each active data transmission connection is examined, the connection type corresponding to each active data transmission traffic class is defined in the first mobile communication network (NW1), and a connection according to the defined connection type is defined for each data transmission connection in the first mobile communication network (NW1).

10 Claims, 5 Drawing Sheets

U.S. PATENT DOCUMENTS

| | | | |
|---|---|---|---|
| 5,410,733 A | 4/1995 | Niva et al. | 455/33.2 |
| 5,483,668 A | 1/1996 | Malkamaki et al. | 455/33.2 |
| 5,504,935 A * | 4/1996 | Vercauteren | 455/438 |
| 5,524,009 A | 6/1996 | Tuutijarvi et al. | 370/95.3 |
| 5,659,598 A | 8/1997 | Byrne et al. | 455/436 |
| 5,710,974 A | 1/1998 | Granlund et al. | 455/33.2 |
| 5,774,809 A | 6/1998 | Tuutijarvi et al. | 455/437 |
| 5,809,399 A | 9/1998 | Tuutijarvi et al. | 455/63 |
| 5,815,801 A | 9/1998 | Hamalainen et al. | 455/63 |
| 5,845,192 A | 12/1998 | Saunders | 455/11.1 |
| 5,864,759 A | 1/1999 | Tat | 455/437 |
| 5,870,675 A | 2/1999 | Tuutijarvi et al. | 455/436 |
| 5,884,176 A * | 3/1999 | Vaara | 455/438 |
| 5,887,254 A | 3/1999 | Halonen | 455/419 |
| 5,896,373 A | 4/1999 | Mitts et al. | 370/331 |
| 5,896,570 A | 4/1999 | Saunders et al. | 455/437 |
| 5,898,925 A * | 4/1999 | Honkasalo et al. | 370/337 |
| 5,903,832 A | 5/1999 | Seppanen et al. | 455/414 |
| 5,912,885 A | 6/1999 | Mitts et al. | 370/331 |
| 5,920,547 A | 7/1999 | Werth | 370/280 |
| 5,924,038 A | 7/1999 | Uistola | 455/450 |
| 5,940,371 A | 8/1999 | Mitts et al. | 370/236 |
| 5,940,760 A | 8/1999 | Uistola | 455/434 |
| 6,032,042 A * | 2/2000 | Kauppi | 455/432 |
| 6,041,235 A * | 3/2000 | Aalto | 455/437 |
| 6,151,495 A * | 11/2000 | Rune | 455/426 |
| 6,201,966 B1 * | 3/2001 | Rinne et al. | 455/434 |
| 6,212,380 B1 * | 4/2001 | Laatu | 455/436 |
| 6,263,203 B1 * | 7/2001 | Jahn | 370/332 |

* cited by examiner

HANDOVER BETWEEN MOBILE COMMUNICATION NETWORKS

The present invention relates to a method for handing over a connection between a first and a second mobile communication network in a wireless terminal, in which method at least one data transmission connection is established for transmitting information between the wireless terminal and one said mobile communication network, wherein in the first mobile communication network, the connection type is either connection-oriented or connectionless, and in the second mobile communication network, at least two traffic classes with different transfer properties are defined, and one of them is selected for the data transmission connection of the second mobile communication network. The invention also relates to a communication system comprising at least a first and a second mobile communication network, a wireless terminal, means for activating at least one data transmission connection for transmitting information between the wireless terminal and one said mobile communication network, and means for connection handover between the first and the second mobile communication network in the wireless terminal, the first mobile communication network comprising means for establishing a connection that is connection-oriented and/or connectionless, and at least two traffic classes being defined for the data transmission connections in the second mobile communication network. The invention also relates to a wireless terminal comprising means for coupling to a communication system which contains means for establishing a data transmission connection to at least a first and a second mobile communication system, which first mobile communication system comprises means for establishing a connection that is either connection-oriented and/or connectionless, and in the second mobile communication network, at least two traffic classes are defined for the data transmission connections.

In this context, the connection handover refers to a situation when a connection is handed over from a wireless terminal which has a connection to a mobile communication network, to another mobile communication network. The wireless terminal refers, in this context, to such a data processor which also has means for establishing a data transmission connection to the mobile communication network. One example of a wireless communication device that can be mentioned is the Nokia 9000 Communicator, which comprises for instance data processing functions and mobile station functions.

In digital mobile phone systems, such as the GSM system, it is possible to transmit messages via a connection-oriented connection, such as a circuit-switched connection. A high-speed circuit-switched connection (HSCSD, High Speed Circuit Switched Data) can be mentioned as an example of such a connection-oriented connection. Furthermore, it is possible to transmit messages without setting up a circuit-switched connection. Such connectionless message transmission methods include for instance short message service SMS, unstructured supplementary service data transmission USSD, or packet based connectionless data transmission service GPRS (General Packet Radio Service). Consequently, in addition to calls and data transfer, the GSM system provides, in the form of the short message service, a service resembling a paging system. The short message service known from the GSM system is, however, much more advanced when compared with the conventional paging system. With a mobile station, it is possible not only to receive text messages but also to send them to another mobile station. Furthermore, one advantage of the short message service in the GSM system is that the transmission and reception of a short message can take place while a circuit-switched connection is open, for example during a call. Thus, the transmission of the short message does not keep the mobile station busy in the possible case of an incoming call.

In packet-switched data transmission, information is transmitted typically in bursts, wherein the interval between the transmission of bursts is influenced for instance by the quantity of information to be transmitted, and the amount of data transmission capacity allocated for the data transmission connection in question. The advantage of such a packet-switched data transmission connection when compared with a circuit-switched data transmission connection is that the data transmission channel allotted for the connection does not have to be allocated solely for one data transmission connection, but several different data transmission connections can use the same data transmission channel. Also in wireless mobile station systems, the circuit-switched data transmission connection is typically implemented in such a way that on the same radio channel, information of different connections is transmitted in different time slots (logical channels). When compared with the packet-switched connection, however, the difference is that even though there was no information in a data transmission connection to be transmitted in the time slot allocated for that data transmission connection, it cannot be utilized in any other data transmission connection either. A high-speed circuit-switched connection (HSCSD, High Speed Circuit Switched Data), which is under development for the GSM system, provides two connection types: a transparent connection and a non-transparent connection. In the transparent connection, the mobile communication network allocates resources for the connection in such a way that the connection has a substantially fixed data transmission rate and a fixed propagation delay. In the non-transparent connection, the mobile communication network can change the channel coding and data transmission rate when required by the circumstances, wherein it is possible for instance to ensure a better error correcting capability than in the transparent connection. The circuit-switched connection allocates at least one logical channel for the whole duration of the connection, which can unnecessarily consume the resources of the communication system.

As examples of the packet-switched data transmission services, the GPRS packet transmission service (General Packet Radio Service) of the GSM system and the packet transmission service of the UMTS system can be mentioned. These different systems and their different versions are not, however, fully compatible with each other. For example, the standard of the stage 1 of the GPRS packet transmission service deviates from the standard of the stage 2 and from the UMTS standard, e.g. with respect to the quality of service (QoS) alternatives that can be defined for the data transmission connection. Thus, when using a wireless terminal, the problem may arise, that a data transmission connection can only be established to a mobile communication network of a particular type, wherein the user should have a wireless terminal suitable for each mobile communication network available. To eliminate this problem, such wireless communication devices are being developed with which it is possible to establish a packet-format data transmission connection to two or more different mobile communication networks when moving from the range of one mobile communication network work to the range of another mobile communication network. In such a situation, the quality of service cannot necessarily be maintained on the same level in the mobile communication network to which a handover is attempted. For example, it should be possible to provide an audio telephone connection with high-speed packet transmission, so that speech would not become obscure and discontinuous at the receiving end. However, in the UMTS system, the aim is to achieve compatibility for instance with systems according to the stage 1 of the GPRS packet transmission service. This requires, for instance, solutions for the aforementioned problem: how to maintain the quality of service of the connection when handing over a data transmission connection from one packet network to another packet network.

It has been suggested that four different traffic classes be defined in the packet transmission service of the UMTS system, and as for the features of these traffic classes, the aim has been to take into account the different criteria for the different connection types. One criterion defined for the first and the second class is the real-time quality of the data transmission, wherein significant delays must not occur in the transmission. However, the accuracy of the data transmission is not such an important criterion. Correspondingly, for the third and fourth class packets, non-real-time data transmission is sufficient, but relatively accurate packet transmission is required. An example of real-time first-class data transmission is the transmission of speech signals in a situation where two or more people discuss with each other via wireless communication devices. An example of a situation where real-time second-class data transmission could be possible, is the transmission of a video signal for immediate viewing. Third-class, non-real-time packet communication can be utilized for example for the use of data base services, such as browsing Internet home pages, in which data transmission with moderate speed and accuracy is a more important factor than real-time data transmission. In the fourth class of this example system, it is possible to categorize for instance the transfer of e-mail messages and files. It is obviously not necessary to have four said traffic classes, but the invention can be applied in packet transmission systems containing three, two, or more than four traffic classes.

directing the data packets to the correct addresses. The wireless communication device MS is coupled to the base station subsystem BSS via a radio interface Um (FIG. 1) The base station subsystem is connected to the packet switching controller SGSN via a BSS-SGSN interface Gp. In the base station subsystem BSS, a base transceiver station BTS and a base station controller BSC are connected to each other with a BTS-BSC interface Abis. The packet switching controllers SGSN can communicate with other packet switching controllers SGSN via a gateway GPRS support node GGSN.

Figure 2:
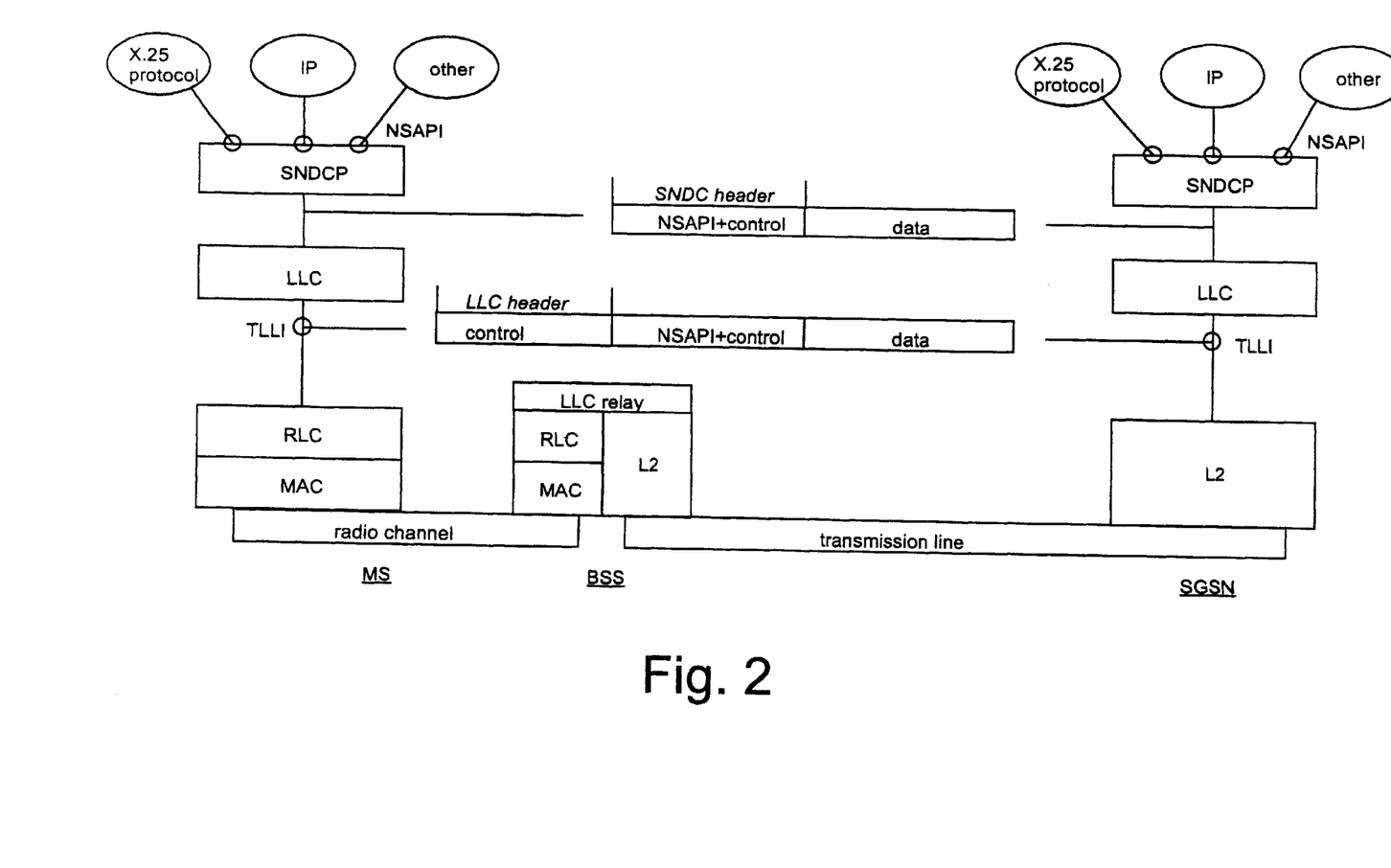
FIG. 2 shows the layer structure of the protocol stack of the GPRS system.

As presented in FIG. 2, the function of the wireless communication device MS and the packet switching controller SGSN can be divided into several layers, each having a different function. The information to be transmitted, such as control signalling and data sent by the user, is transmitted between the wireless communication device MS and the packet switching controller SGSN advantageously in a data frame format. The data frame of each layer consists of a header field and a data field.

The information contained in the data field can be, for example, data entered by the user of the wireless communication device, or signalling information. The functions of the layers of the GPRS system are presented in the following.

Lowest in the data link layer there is a MAC layer (Media Access Control), which is responsible for using the radio channel in communication between the wireless communication device MS and the base station subsystem BSS, e.g. allocating channels in packet transmission and reception.

Data transmission between the base station subsystem BSS and the packet switching controller SGSN on the lowermost level takes place in the L2 layer (data link layer), which uses a link layer protocol, such as the LAPD protocol according to the standard Q.921, a frame relay protocol, or the like. The L2 layer can also contain quality and routing data according to the GPRS specifications. The L2 layer contains features of the physical layer and the data link layer of the OSI model.

Above the MAC layer, there is an RLC layer (Radio Link Control), for the purpose of dividing the data frames estab-

TABLE 1

| Class | First class: real-time, e.g. telephone conversation guaranteed capacity no acknowledgement | Second class (business class): real-time, e.g. video information guaranteed capacity acknowledgement possible buffering on application level | Third class (tourist class): interactive best effort method acknowledgement Internet browser Telnet real-time control channel | Fourth class (cargo class): backgroud transmission with best effort method acknowledgement background download of e-mail messages, calendar events, etc. |
|---|---|---|---|---|
| Delay | 100 ms, 200 ms, 300 ms | <1 s | 2 s | Not defined |
| Bit error rate | $10^{-3}, 10^{-4}, 10^{-5}, 10^{-6}$ | $10^{-5}, 10^{-6}, 10^{-7}, 10^{-9}$ | $<10^{-9}$ | $<10^{-9}$ |
| Max bit rate | $MB_{max}$ & $MB_{min}$, network returns MB': $MB_{min} < MB' < MB_{max}$ | $MB_{max}$ & $MB_{min}$, network returns MB': $MB_{min} < MB' < MB_{max}$ | Not defined | Not defined |
| User priority | High, medium, low | High, medium, low | High, medium, low | High, medium, low |

Figure 1:
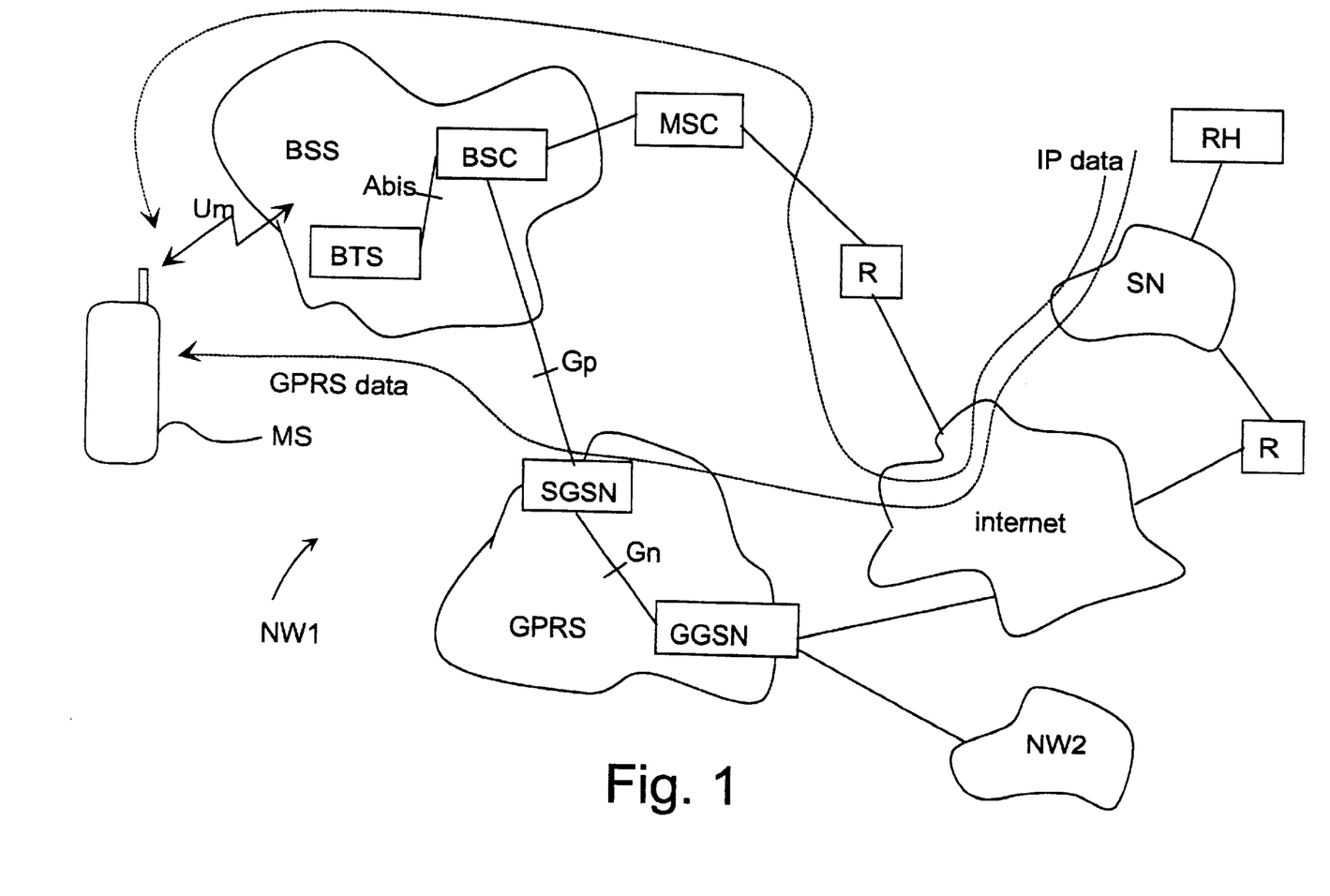
FIG. 1 is a reduced diagram showing the coupling of a wireless terminal to the Internet network via a first mobile communication network.

FIG. 1 is a block diagram showing the blocks essential for the function of the GPRS system. A serving GPRS support node SGSN controls the function of the packet transmission service on the cellular network side. The packet switching controller SGSN attends to the logon and logout of the wireless communication device MS, updating the location of the wireless communication device MS, and lished by the LLC layer into packets of fixed size that can be transmitted on the radio channel (PDU, Protocol Data Unit), and transmitting, and when necessary, re-transmitting packets. The length of the packets in the GPRS system is the length of one GSM time slot (ca 0.577 ms).

The LLC layer (Logical Link Control) provides a reliable data transmission link between the wireless communication device MS and the packet switching controller SGSN. The LLC layer, for instance, supplements the message to be transmitted with error correction data, by means of which it is possible to try to correct incorrectly received messages and, if necessary, the message can be retransmitted. Furthermore, data encryption and decryption is performed in the LLC layer.

Protocol modifications, compression and segmentation of the information to be transmitted, and segmentation of the messages coming from an upper layer are performed in the SNDCP layer (Sub-Network Dependent Convergence Protocol). The SNDCP frame comprises advantageously an SNDCP header and SNDCP field. The SNDCP header is composed of protocol data (Network Service Access Point Identity, NSAPI) and SNDCP control data, such as compression, segmentation and encoding definitions. The SNDCP layer functions as a protocol interface between the protocols (IP/X.25) used in the upper layer and the protocol of the LLC layer (data link layer).

The information to be transmitted enters the SNDCP layer from an application advantageously in data packets according to a protocol (PDP, Packet Data Protocol), such as messages according to the X.25 protocol or packets of the Internet protocol (IP). The application can be, for example, the data application of a wireless communication device, a telecopier application, a computer program which communicates with the wireless communication device, etc.

The SNDCP frame is transmitted to the LLC layer, in which the frame is supplemented with an LLC header. The LLC header comprises for instance an LLC control element, which specifies the number of the frame and the type of the command (info, acknowledgement, request for re-transmission, etc). When logging into the GPRS packet network, the wireless communication device transmits a login request message to the packet switching controller SGSN. On the basis of wireless communication device identification (IMSI, International Mobile Station Identity), the packet switching controller SGSN can retrieve information from a home location register HLR corresponding to the wireless communication device in question, wherein the packet switching controller SGSN can use this information to select a temporary logical link identity (TLLI) for the data transmission connection. If the wireless communication device has previously had a TLLI identity at its disposal, the wireless communication device transmits this in the request message, wherein the packet switching controller SGSN can allow this identity to be used again by the wireless communication device, or allocate a new TLLI identity. The packet switching controller SGSN transmits the selected TLLI identity to the wireless communication device to be used in the data transmission connection between the wireless communication device and the packet switching controller SGSN. This TLLI identity is used in the data transmission to define the data transmission connection in which the message in question belongs to. The same TLLI identity can only be used in one data transmission connection at a time. After the connection is terminated, the TLLI identity used in the connection can be given to a new connection which is being established.

The cells of the packet network are divided into routing areas in such a way that each routing area comprises several cells. Thus, the purpose of the mobility management functions of the wireless communication device is to maintain data on the location and connection state of the wireless communication devices in the service area of the packet network. This data is maintained both in the wireless communication device and in the packet network, advantageously in the GPRS support node SGSN.

In radio links, data is typically transmitted in a channel which is a particular frequency domain. One system can contain several channels which are available simultaneously. Furthermore, in full duplex data transmission, there are separate transmission and reception channels, wherein e.g. the base station transmits to the terminal via a transmission channel (downlink), and the terminal transmits to the base station via a reception channel (uplink). The problem with radio links is that the radio channel is a limited resource which restricts, for instance, the bandwidth that can be allocated for the radio link, the channel width used in the data transmission, and/or the number of channels and the data transmission rate available. The radio channel is liable to interference, such as distortion of the received signal caused by multipath propagation, that is, the same signal reaches the recipient via different routes at different times. To reduce the effect of interferences, part of the data transmission capacity has to be used to transmit error correction data with the packets, and it may require several re-transmissions of packets to achieve the desired error probability rate, which reduces the capacity of the radio link.

In such radio links where several data transmission flows are transmitted via one channel, the packets of these different data transmission flows are transmitted in time slots. The transmission order can be influenced by priorisation of packets of different data transmission flows, wherein packets of higher priority flow are transmitted more frequently than packets of lower priority flow. Such packets include, for instance, packets of a real-time application which are also aimed to be constructed as short as possible. On the other hand, packets of lower priority applications are often considerably longer than packets of higher priority. In systems of prior art, such a long packet prevents the transmission of other packets as long as the packet is transmitted. This may cause significant delays in the transmission of packets of even higher priority and impair the quality of service.

The term "Internet" is generally used to describe a data resource from which data can be retrieved with a data processor, such as a personal computer (PC). The data processor communicates with the telecommunication network via a modem. This information resource is distributed globally, and comprises several storage locations which also communicate with the telecommunication network. The Internet is made to function by specifying certain communication standards and protocols, such as TCP (Transfer Control Protocol), UDP (User Datagram Protocol), IP (Internet Protocol), and RTP (Real time Transport Protocol), which are used to control data transmission between the numerous parts of the Internet data network. The TCP and the UDP relate to preventing and correcting data transmission errors of data transmitted in the Internet data network, the IP concerns the structure of the data and routing, and the RTP is designed for real-time data transmission in the Internet data network. The Internet protocol versions currently in use are IPv4 and IPv6.

Packet-format data transmission enhances the utilization rate of the data transmission channel in general, not only for the purpose of retrieving information from the Internet data network. For example, packet data transmission can be used in applications such as audio calls, video conferences and other data transmissions according to different standards. However, some of these applications are time critical. For example in a real-time audio call, the best effort quality of service provided by the Internet protocol can cause significant delays in the transmission and transfer of the audio signal, which affects the comprehension of the received audio signal in such a way that for example speech becomes almost or totally unintelligible. Furthermore, the delay (the time passed between the transmission and reception of the packet) can vary during the transmission of the audio signal, depending, for instance, on the loading of the communication network and the variations in transfer errors. The same applies also to the transmission of a real time video signal. There may be situations, when the users of the Internet data network do not want such long delays which occur in many cases of data retrieval from the Internet data network.

The Internet Engineering Task Force (IETF) is an organization concerned with developing the Internet architecture and operating in the Internet data network. At present, the IETF is developing a new protocol which offers an Internet terminal a possibility to request for the desired quality of service QoS from the defined quality of service levels QoS available. This protocol is known as a resource reservation protocol (RSVP), and it is presented in the standard proposal "Resource ReSerVation Protocol (RSVP)—Version 1 Functional Specification", Braden, R., Zhang, L., Berson, S., Herzog, S., Jamin, S., RFC 2205, September 1997 (available at the address http://www.isi.edu/div7/rsvp/pub.html). The Internet teminal uses the RSVP protocol when requesting for a certain quality of service QoS from the Internet network on the basis of the data transmission flow which the Internet terminal wants to receive from a remote terminal. The RSVP protocol transfers the request through the network by means of routers which the network uses to transfer the data transmission flow to the receiving Internet terminal. In each router, the RSVP protocol tries to allocate a resource for the data transmission flow in question. The RSVP protocol also tries to allocate a resource for the data transmission flow in the receiving and transmitting Internet terminal.

In order to conduct resource allocation in a node which can be either a router or an Internet terminal, the RSVP protocol communicates with two local decision modules, an admission control module and a policy control. The addmission control module deduces, whether the resources of the node are sufficient for providing the requested quality of service. The policy control module deduces whether the user has an access right to make the allocation. If either of the checkings is unsuccessful, the RSVP protocol returns an error message to the application that produced the request. If both the tests are successful, the RSVP protocol sets parameters for the classification and scheduling of the packet in the transmitting Internet terminal in order to attain the desired quality of service. The classification of the packet determines a quality of service class for all packets, and the scheduling controls the transmission of packets in order to achieve the promised quality of service in all data transmission flows.

The RSVP protocol functions on top of the Internet protocol both in the IPv4 and IPv6. The RSVP protocol is especially designed to utilize the strong features of the routing algorithms in the present Internet data network. The RSVP protocol does not perform the routing as such but it uses the lower level routing protocols to deduce where the allocation requests should be transferred. Because the routing changes the routes in order to adapt to changes in topology of the Internet network, the RSVP protocol adjusts its resource allocation to the new routes when necessary.

The standard proposal suggests two quality of service levels to be implemented in the RSVP protocol in addition to the existing best effort service: guaranteed service and controlled load service. The guaranteed service provides the connection with both a fixed transmission delay and a fixed bandwidth, and it is intended for transmitting e.g. a real-time audio call via an Internet connection. The purpose of the controlled load service is to provide the data transmission connection also in the loaded data transmission system with a quality of service substantially equal to that possible in an unloaded data transmission system. The controlled load service level is especially suitable for applications in which a considerable delay in the information transmission is allowed but, on the other hand, the aim should be to minimize the delay.

The purpose of the present invention is to find a solution e.g to the problem, in a connection handover situation, of how to implement the handover of data transmission connections active in a wireless communication device from one mobile communication network to another mobile communication network in such a way that the quality of service set for the data transmission connection at a time can be maintained as well as possible also in that mobile communication network to which the connection is handed over. The invention is based on the idea that when changing the mobile communication network, the active connections available in the wireless terminal at that moment and their traffic classes are examined, the traffic class corresponding to each connection is defined in the mobile communication network to which the connection is handed over, and a defined traffic class is set for each connection in said mobile communication network. The method according to the present invention is characterized in that in the method:

it is examined what active data transmission connections the wireless terminal has to the mobile communication network handing over the connection, when handing over a connection from the first mobile communication network to the second mobile communication network, the connection type of each active data transmission connection is examined, the traffic class corresponding to each active data transmission connection type is defined in the second mobile communication network, and a connection according to the defined traffic class is established for each data transmission connection in the second mobile communication network, when handing over a connection from the second mobile communication network to the first mobile communication network, the traffic class of each active data transmission connection is examined, the connection type corresponding to each active data transmission traffic class is defined in the first mobile communication network, and a connection according to the defined connection type is defined for each data transmission connection in the first mobile communication network.

The communication system according to the invention is characterized in that the communication system also comprises:

means for examining the active connections between the wireless terminal and the mobile communication network handing over the connection, means for handing over the connection comprising:

means for examining the connection type of the active data transmission connections in the first mobile communication network, means for defining a traffic class corresponding to each active connection type of the data transmission in the second mobile communication network, and means for establishing a connection according to the traffic class defined for each data transmission connection in the second mobile communication network, and means for examining the traffic class of the active data transmission connections in the second mobile communication network, means for defining a connection type corresponding to each active traffic class of the data transmission connection in the first mobile communication network, and means for establishing a connection according to the defined connection type for each data transmission connection in the first mobile communication network.

Furthermore, the wireless terminal according to the invention is characterized in that the wireless communication device also comprises:

means for examining the active connections between the wireless terminal and the mobile communication network handing over the connection, means for handing over the connection comprising:

means for examining the connection type of the active data transmission connections in the first mobile communication network, means for defining a traffic class corresponding to each active connection type of the data transmission in the second mobile communication network, and means for establishing a connection according to the traffic class defined for each data transmission connection in the second mobile communication network, and means for examining the traffic class of the active data transmission connections in the second mobile communication network, means for defining a connection type corresponding to each active traffic class of the data transmission connection in the first mobile communication network, and means for establishing a connection according to the defined connection type for each data transmission connection in the first mobile communication network.

With the present invention, considerable advantages are achieved when compared with methods of prior art. The method according to the invention enables a connection handover between mobile communication networks without terminating data transmission connections, and in such a way that the quality of service of the active connections is not impaired substantially. The invention enables, for instance, compatibility between the UMTS cellular network and the stage 1 of the GPRS system of the GSM cellular network in a packet-format data transmission. In the communication system according to the invention, it is possible to attain an effective use of the data transmission resources, for instance because in a connection handover situation, in the mobile communication network receiving the connection, resources are allocated for data transmission connections according to the quality of service allocated for the data transmission connection in the mobile communication network from which the connection is handed over.

In the following, the invention will be described in more detail with reference to the appended figures, in which.

The invention will be described by using the GSM cellular network as an example of the first mobile communication network, and the UMTS cellular network as an example of the second mobile communication network. An example of the wireless terminal will be provided by such a wireless communication device which comprises means for e.g. establishing a packet-format data transmission connection both to the GSM cellular network and to the UMTS cellular network. However, the invention can also be applied in other wireless data transmission networks and wireless terminals in which packet-switched data transmission is available. Such a wireless terminal may also be composed of a computer, e.g. a laptop computer, to which a wireless data transmission device, such as a radio modem is connected. An example of the data transmission connection will be a coupling via the Internet data network to another terminal, which can be a wireless terminal or a line teminal.

As stated above in this specification, one feature of the GSM mobile communication system is that both a circuit-switched connection and a packet connection are implemented in it. At present, it seems that also in the future, these two connection types will be implemented in digital mobile communication systems. By selecting either a circuit-switched connection or a packet-switched connection according to the situation, it is possible to affect the quality of service available for the data transmission connection. Typically, circuit-switched connection is used in real time applications, whereas a packet connection is used in non real-time applications. In order to use both connection types, it has to be possible for the wireless communication device to monitor the control channels of both connection types. The minimum requirement in the wireless communication device is that at least one connection type can be activated for use at a time.

The quality of service defines, for instance, how packets (PDU, Packet Data Units) are processed during transmission in a data transmission network, such as the GPRS network. For example, the quality of service levels defined for connection addresses are used to control the transmission order, buffering (packet queues), and cancelling of packets in a support node and in a gateway support node especially when there are simultaneously two or more connections which have packets to be transmitted. Different quality of service levels define different delays lays, for the packet transmissions between the different ends of the connection, different bit rates and the number of packets to be cancelled celled can vary in connections of different quality of service levels.

For each connection (connection address), it is possible to request a different quality of service. For example in e-mail connections, a relatively long delay can be allowed in the message transmission. However, for example in interactive applications, high-speed packet transmission is required. In some applications, as in file transfer, it is important that the packet transmission is virtually flawless, wherein packets are retransmitted transmitted in error situations, if necessary.

In the current GPRS system, the quality of service profile contains five different parameters: service precedence, delay class, reliability, average age bit rate, and maximum bit rate. Service precedence defines a kind of priority for the packets belonging to a certain connection. Delay class defines average and maximum delays for all the packets belonging to the same connection. Reliability defines whether in the data transmission an acknowledgement (ARQ) is used or not (no ARQ) in the logical link control layer LLC and in the radio link control layer RLC. Furthermore, more, reliability is used to define whether a protected mode is used in unacknowledged data transmission, and whether the GPRS backbone network uses the TCP or the UDP protocol when transmitting packets belonging to the connection. On the basis of these said parameters, four quality of service classes are established in the GPRS system, which define the quality of service provided by the LLC layer to the connection. These quality classes are distinguished by a special service ice access poinet identifier (SAPI).

Figure 3:
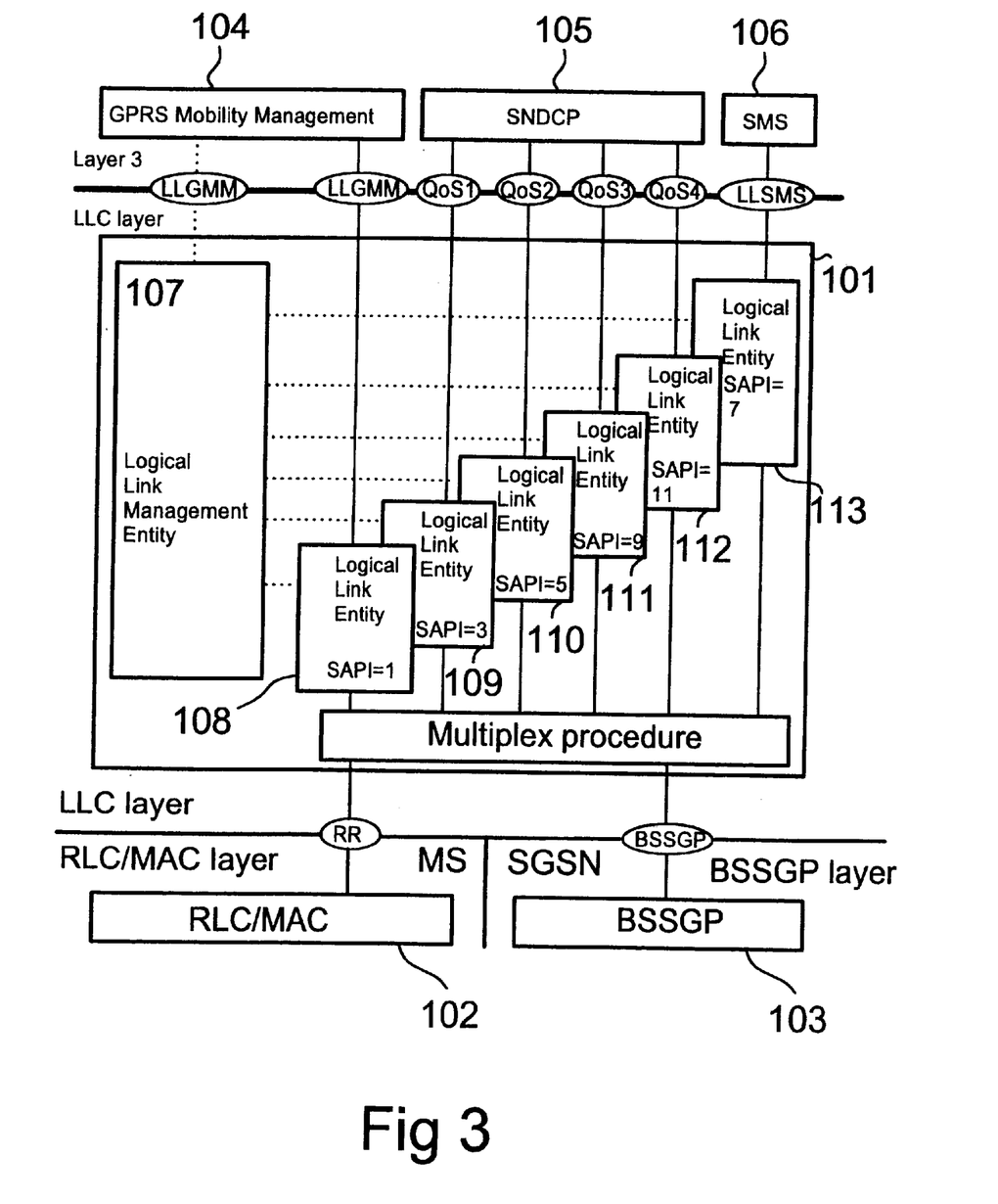
FIG. 3 shows the function of a known LLC protocol layer in a wireless communication device and in a GPRS support node.

The appended FIG. 3 presents the function of a known LLC protocol layer 301 in a wireless communication device and in a GPRS support node. Block 302 illustrates the functions of a known RLC/IMAC (Radio Link Control/Media Access Control) layer, which are necessary between the LLC layer 301 and the wireless communication device (not shown). Correspondingly, block 303 illustrates the functions of a known BSSGP (Base Station Subsystem GPRS Part) layer, which are necessary between the LLC layer 301 and the nearest serving GPRS support node (not shown). The interface between the LLC layer 301 and the RLC/MAC layers is called the RR interface, and the interface between the LLC layer 301 and the BSSGP layers is called the BSSGP interface.

Above the LLC layer 301, there are known GPRS mobility management functions 304, SNDCP functions 305, and short message service functions 306, 306, which all belong to a layer 3 in the presented layer structure. Each one of these blocks has one or more interfaces to the LLC layer 301, for coupling to the different parts of the same. Logical link management block 307 has an LLGMM control interface (Logical Link—GPRS Mobility Management) to the block 304. The mobility management data is routed via the LLGMM interface between the block 304 and the first LLE block (Logical Link Entity) of the LLC layer. The second 309, 309, third 310, fourth 311, and fifth 312 LLE block are connected to block 305 via corresponding interfaces. Terms QoS 1, QoS 2, QoS 3, and QoS 4 are also used for these blocks according to the quality of service of the packets processed by these blocks. The sixth LLE block 313 of the LLC layer is connected to block 306 via an LLSMS interface (Logical Link—Short Message Service). The service access point identifiers of the first 308, second 309, third 310, fourth 311, fifth 312, and sixth LLE block are 1, 3, 5, 9, 11, and 7, respectively. In the LLC layer, each one of these LLE blocks is connected to a multiplexing block 314 which processes connections via the RR interface to block 302, and further to the wireless communication device, as well as connections via the BSSGP interface to block 303 and further towards the support node SGSN.

The connection between the multiplexing block 314 and the lower layer block 302 in the direction of the wireless communication device is called a "transmission pipe". Because all the packet flows between the upper parts of the LLC layer and lower layers 302 are passed via the same multiplexing block 314 and transmission pipe, the quality of service refers to this transmission pipe. When setting up a connection, resources sources are allocated for it in the mobile communication network in such a way that the quality of service of the connection would be as close as possible to that requested. In resource allocation, it is advantageous to take into account e.g. the maximum bit rate and average bit rate requested for the connection. In the wireless communication device it is, however, possible to have several applications requiring packet data service running simultaneously. Consequently, certain resources are allocated for these applications, which resources, if divided among different applications, may cause problems in maintaining the quality of service. For example, in case there are both real-time applications and non-real-time applications running simultaneously, for which the resources are allocated dynamically, the transmission of packets of a non-real-time application also takes up resources from real-time applications, whose quality of service can thus be impaired, for instance due to transmission delays.

Figure 4:
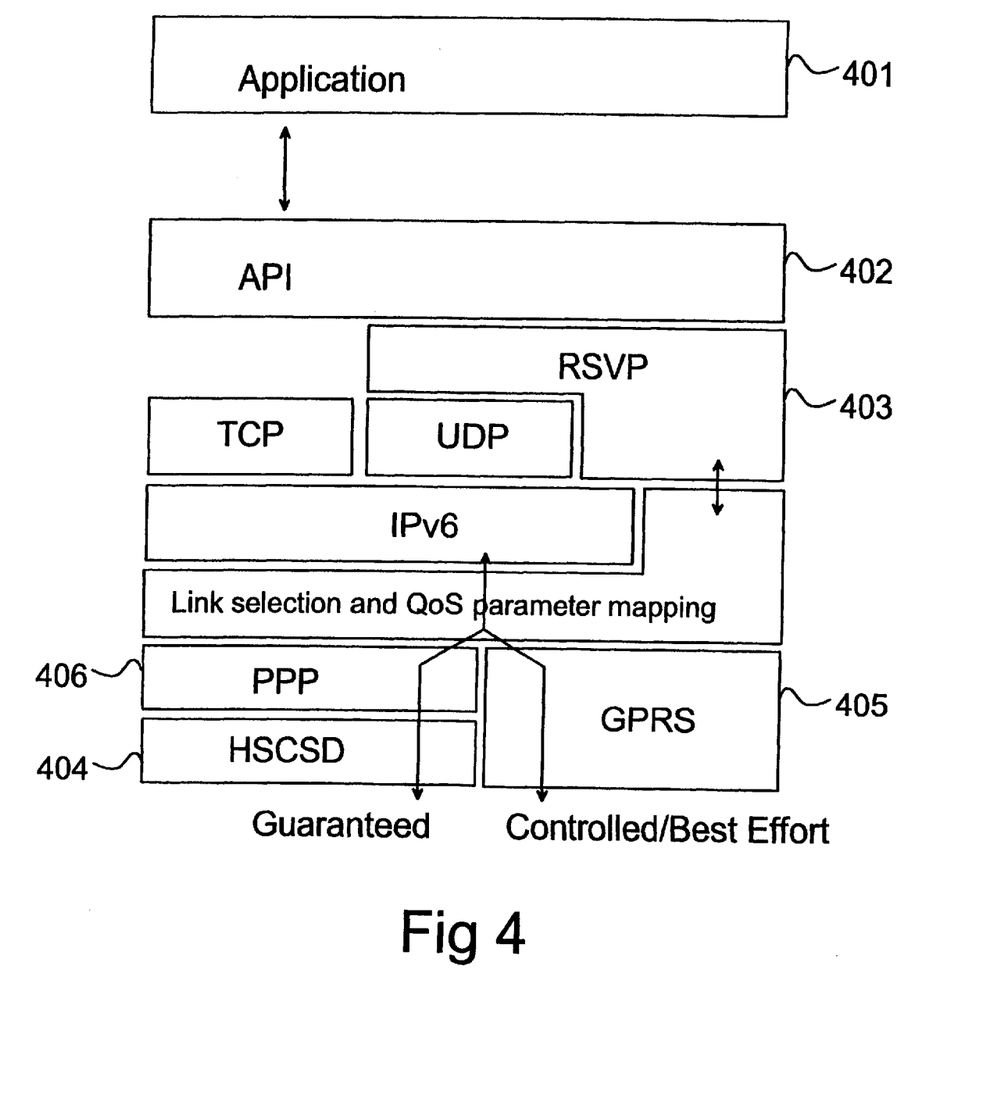
FIG. 4 shows a packet transmission mechanism in the layer structure of a protocol stack according to the GPRS system.

In the following, with reference to the data transmission system according to FIG. 1 and to the protocol stack according to the FIG. 4, a situation will be described in which information is transmitted to a wireless terminal MS1 from a second terminal RH. It is assumed that the wireless terminal MS1 is within the service area of the mobile communication network NW1 and that the receiving terminal RH communicates with the Internet data network via a subnetwork SN and a first router R1.

The user of the wireless communication device MS1 can use the Internet network for example in such a way that an application program 401, e.g. a browser, is started up in the wireless communication device MS1. In the application program, the user of the wireless communication device sets as a target address the address of the desired Internet server or Internet terminal, for example the address of the Internet server of the service provider with whom the user of the wireless communication device has made a contract for the use of Internet services.

To start with, the wireless communication device MS1 initiates a connection set-up to the first mobile communication network NW1. The Internet application of the wireless communication device MS1 to which the information is finally transmitted, starts resource allocation advantageously according to the RSVP protocol to attain the desired quality of service. Data on the quality of service allocated by the first mobile communication network NW1 for the data transmission connection is transmitted to the application program advantageously via an application program interface 402 (API), which is provided with RSVP protocol functions. The application program interface transmits the quality of service data to the RSVP layer 403 of the protocol stack, which is responsible for that the resources allocated for the data transmission connection in the Internet data network are sufficient to secure the quality of service. In the case of guaranteed service quality and controlled load service quality, control messages (Path and Resv) are transmitted to the Internet network in order to allocate resources. In this preferred embodiment, the best effort quality level does not require control messages to be transmitted.

Furthermore, the application program interface API performs a coupling between the quality of service allocated for the data transmission connection and the corresponding connection type, and initiates a connection set-up to the first mobile communication network NW1. In the case of guaranteed service, the connection in this preferred embodiment is established as a circuit-switched connection, preferably as an HSCSD connection 404. In the controlled load service, packet-switched connection GPRS 405 is used, advantageously a connection of class 3 (QoS 3 in FIG. 3). In other cases, a packet-switched connection GPRS 405 is used, advantageously a connection of class 4 (QoS 4, in FIG. 3). If the high-speed circuit-switched connection HSCSD 404 is selected as the connection type, the wireless communication device requests an Internet address for the connection, preferably with a PPP protocol 406 (Point-to-Point Protocol). If, on the other hand, the connection type selected is a packet-switched connection, the gateway GGSN of the GPRS support nodes functions as a home agent for the wireless communication device MS, and attaches the Internet address individualizing the data transmission connection to a line identification ID of the wireless communication device used in the data transmission connection.

The information produced in the application of the second terminal RH is transmitted to the wireless communication device MS1 via the Internet network according to the Internet protocol, in a way known as such, by routing either to the packet network of the first mobile communication network NW1 via the gateway GGSN of the GPRS support nodes, or to the circuit-switched network HSCSD of the first mobile communication network NW1 via a second router RT2. In the former case, the information to be transmitted is modified to correspond to the packet switching mechanisms of the first mobile communication network NW1, in this case into packets of the GPRS network, and the desired quality of service is taken into account (classes 3 and 4). Information is transmitted forward via a base station controller BSC to a base transceiver station BTS, and further to the wireless communication device MS1, in which the received message is transferred to the application level to be processed by the application. In the latter case, a gateway mobile services switching center GMSC in the first mobile communication network NW1 receives the IP packets and formulates them into such a format that they can be transmitted via a circuit-switched connection, and transmits them to a base station subsystem (BSS).

When the user of the wireless terminal MS1 is moving, or for some other reason, a need may arise to hand over an active data transmission connection to a second mobile communication network NW2. In that case, the wireless communication device MS1 examines what data transmission connections to the first communication network NW1 are active at that moment. Furthermore, the wireless communication device MS1 examines the quality of service class set for each active connection. This quality of service class is advantageously defined at the connection set-up stage, for instance on the basis of the quality of service requested for the connection. If the wireless communication device MS1 has one or more connections active, for which the guaranteed service is defined, and which are transmitted via a circuit-switched channel HSCSD, such connections are set into a first quality class according to the second communication network. Furthermore, if the wireless communication device MS has one or more active connections of controlled load service, also the delay requirement set for the connections is examined. Such connections, for which long delays are not allowed, typically real-time applications, are set into a second quality class in the second communication network NW2. Correspondingly, connections for which delays are allowed to a certain extent, are set into a third quality class in the second communication network NW2. Said delay requirement can be deduced e.g. from the data transmission protocol used in the connection. If the data transmission protocol is UDP/RTP, the connection is projected to be liable to delays, wherein the connection is set into the second quality class. In other cases, the connection is set into the third quality class in the communication system according to this preferred example.

The delay requirement can also be examined on the basis of other information. It is possible that at the connection set-up stage, the application for which the data transmission connection is established, has set certain delay requirements for the wireless communication device MS1 in which the application is used. The application program can transmit, for instance, this delay information to the protocol stack via an application program interface API.

Connections according to the best effort are typically set into the third quality class in the second mobile communication network NW2. However, if the application program has advantageously marked the connection as background communication, this kind of a connection is set into a fourth quality class.

Figure 5:
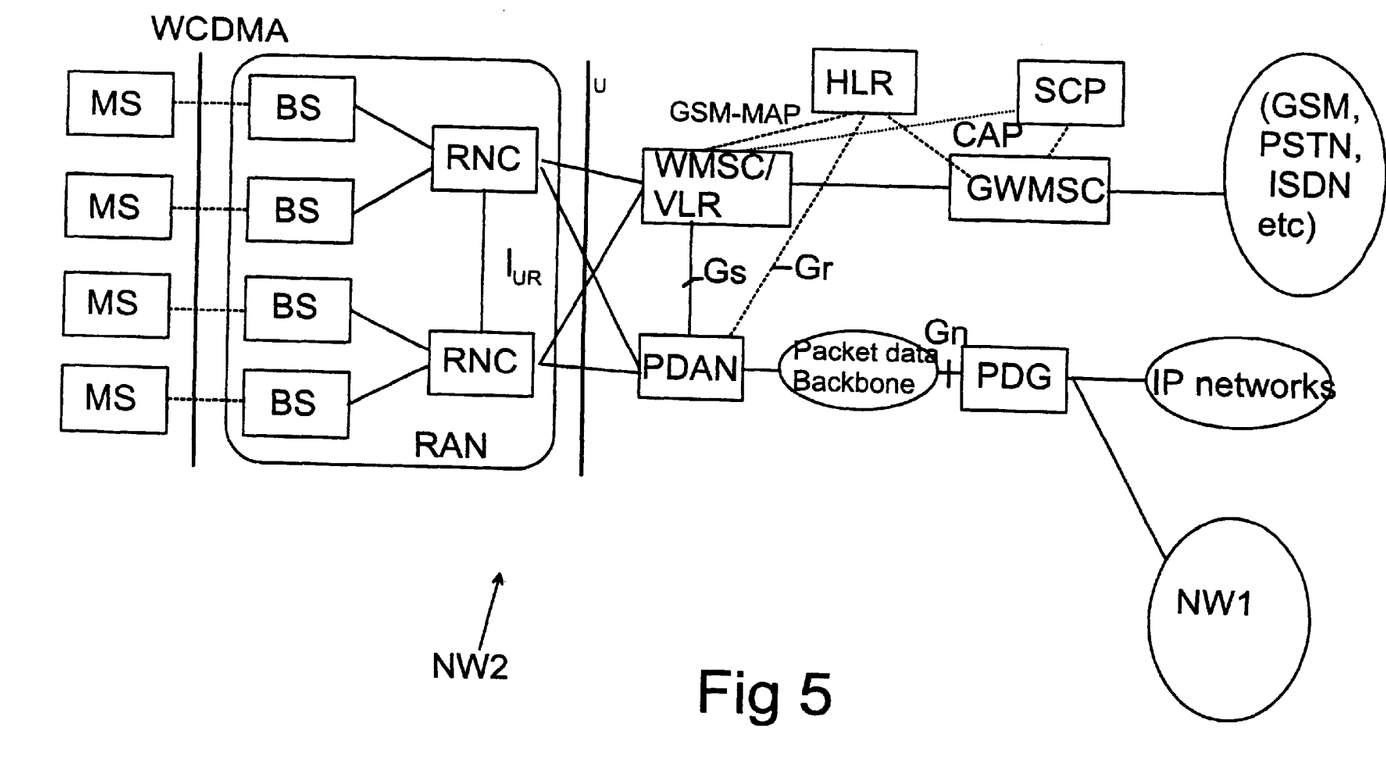
FIG. 5 is a reduced diagram showing the coupling of a wireless terminal to the Internet network via a second mobile communication network.

Furthermore, data transmission from another Internet terminal to the wireless communication device MS1 via the second mobile communication network NW2 in this preferred example via the UMTS cellular network, will be described with reference to FIG. 5. It is assumed that in this second mobile communication network NW2 four quality of service classes are defined. First, the wireless communication device MS1 starts to set-up a connection to the second mobile communication network NW2. The Internet application of the wireless communication device vice MS1, to which the information is finally transmitted, begins resource source allocation advantageously according to the RSVP protocol in order to achieve the desired quality of service. At this stage, the quality of service of the second mobile communication network NW2 is advantageously modified to correspond to the quality of service definitions of the Internet data network. It is obvious, that if the data transmission connection is established to a data network in which the quality of service definitions correspond to the quality of service definitions of the second communication network NW2 according to this example, it is not necessary to perform the aforementioned modification. Data on the quality of service allocated by the second mobile communication network NW2 for the data transmission connection, is transmitted to the application program advantageously via an application program interface API in which RSVP protocol functions are established. The application program interface transmits the quality of service data to the RSVP layer of the protocol stack, which is responsible for that the resources allocated for the data transmission connection are sufficient to secure the quality of service from the Internet data network.

The application program interface API also performs a coupling between the quality of service allocated for the connection and the corresponding connection type, and starts to set-up a connection to the second mobile communication network NW2. In all cases, the packet-switched connection is advantageously used, but resources, such as the bandwidth, are allocated according to the quality of service allocated for the data transmission connection.

The information produced in the application of the second terminal RH is transmitted to the wireless terminal MS1 via the Internet network according to the Internet protocol in a way known as such, by routing to the packet network of the second mobile communication network NW2 via a packet data gateway PDG in the second mobile communication network. The information to be transmitted is modified to correspond to the packet transmission mechanisms of the second communication network NW2 in this case into packets of the UMTS network, and the desired quality of service is taken into account. The information is transmitted forward via a packet data access node PDAN to a radio access network RAN. The radio access network RAN is composed of radio network controllers RNC and base stations BS, via which packets are transmitted to the wireless terminal MS1. The message received in the wireless terminal MS1 is transmitted to the application layer to be processed by the application.

Correspondingly, when the user of the wireless communication device MS1 is moving, or for some other reason, a need may arise to hand over an active data transmission connection to the first mobile communication network NW1. Thus, when handing over a connection from the second mobile communication network NW2 to the first mobile communication network NW1, the quality of service levels are set in the wireless communication device advantageously in the following way. In the wireless communication device MS1, it is examined which data connections to the second mobile communication network NW2 are active at that moment, and what is the connection quality class set for each connection. Connections of the first and the second quality class are coupled via a circuit-switched connection, and other connections are coupled via a packet-switched connection in the first data transmission network NW1. If, however, the wireless communication device MS is a wireless communication device which can only contain either a circuit-switched connection or a packet-switched connection, all data transmission connections are coupled via a circuit-switched connection, even if only one connection is to be coupled via a circuit-switched connection. In case there is only a circuit-switched connection available at the moment of connection handover, the connections are coupled via a circuit-switched connection. At the same time, the quality class of the most demanding connection is examined in order to select whether to use a transparent connection (at least one first or second class connection active), or a non-transparent connection (at least one third or fourth class connection active). Correspondingly, in a situation where there is only a packet-switched connection available at the moment of connection handover, the connections are coupled via a packet-switched connection, and at the same time the quality class of the most demanding connection is examined to select a most suitable quality of service. In this way, it is possible to better secure a quality of service also for connections requiring a higher quality of service.

In the above-presented situation, in which a connection type that corresponds to the traffic class used in the mobile communication network handing over the connection cannot be found in the mobile communication network receiving the connection, it is possible to perform the selection not only on the basis of the aforementioned connection, which is most demanding primarily with respect to the transfer delay, but also according to a priorization order possibly set by the user.

With different quality of service levels it is possible to support services requiring various data transmission capacities (audio calls, data connections, video connections, etc) in wireless communication between a data network, such as the Internet data network, and a wireless terminal. As criteria for the required quality of service level, one can in this context mention the transmission delay of packets, the stability, i.e. the variation (jitter) in the frequency of transmitting packets belonging to the same data flow, bandwidth, and the reliability of the data transmission. When defining the quality of service QoS, it is also possible to utilize information in the header field of the application accompanying the Internet message. At present, a standard is under development to specify how these quality of service levels could be presented and what they would be. In any case, the header field of a message according to the Internet protocol includes information on the type of the information contained in the message which can be, for example an audio application, a video application, a data application, or a combination of these. Different application types usually have different requirements. For example, the real-time quality of the audio and video applications usually requires that the packets have to be transmitted to the recipient within a certain response time, or otherwise the packets have to be cancelled. However, in data transmission, for example when transferring program files, the accuracy of the data transmission is much more important than its real-time quality. In methods and cellular networks of prior art, it is defined at the designing stage what is the probability of errors in the data transmission, on the basis of which it is possible to select error correction algorithms and to set e.g. a maximum number of re-transmissions. All the information in packets is transmitted according to the same criteria. If a packet is transmitted inaccurately, it is re-transmitted. These re-transmissions are repeated either as long as it takes to receive the packet accurately, or, if a response time is set for the packet, the packet is rejected if it cannot be accurately received within a given time, or if the maximum number of re-transmissions is exceeded. Because in audio and video applications even partly inaccurately received information would be sufficient, this re-transmission puts an unnecessary load on the radio access network. On the other hand, additional loading reduces the radio resources available for the other applications, and thus affects the quality of service obtained by the other applications. For detecting and correcting errors, there are several methods developed which are of prior art known to anyone skilled in the art, wherein it is not necessary to discuss them in detail in this context. Furthermore, it should be mentioned that increasing the error detection and correction capacity of the error detection and correction algorithms increases the need for data transmission. These conflicting requirements set a limit to how efficient an algorithm is selected, to avoid unnecessary delay in data transmission.

Even though the invention was described above by using the Internet data network as an example, it is obvious that the invention can also be applied in other situations in which data is transmitted with a wireless teminal MS1 via a mobile communication network, and during the data transmission, a need arises to hand over the connection to another mobile communication network NW1, NW2 . Thus, the traffic classes to be applied in the different mobile communication networks NW1, NW2 are provided with couplings which best correspond to each other and on the basis of which a connection type and a quality of service is defined in that mobile communication network NW1, NW2 to which the connection is handed over.

The invention is not restricted solely to the embodiments presented above, but it can be modified within the scope of the appended claims.

What is claimed is:

1. A method for handing over a connection between a first (NW1) and a second mobile communication network (NW2) in a wireless terminal (MS1), in which method at least one data transmission connection is established for the purpose of transmitting information between the wireless terminal (MS1) and one said mobile communication network (NW1, NW2), the connection type in the first mobile communication network being either connection-oriented (HSCSD) or connectionless (GPRS), and wherein at least two traffic classes with different transmission features are defined in the second mobile communication network (NW1, NW2) and one of them is selected for the data transmission connection of the second mobile communication network (NW1, NW2), characterized in that in the method:

it is examined what active data transmission connections the wireless terminal (MS1) has to the mobile communication network (NW1, NW2) handing over the connection, when handing over a connection from the first mobile communication network (NW1) to the second mobile communication network (NW2), the connection type of each active data transmission connection is examined, the traffic class corresponding to each active data transmission connection type is defined in the second mobile communication network (NW2), and a connection according to the defined traffic class is established for each data transmission connection in the second mobile communication network (NW2), when handing over a connection from the second mobile communication network (NW2) to the first communication network (NW1), the traffic class of each active data transmission connection is examined, the connection type corresponding to each active data transmission traffic class is defined in the first mobile communication network (NW1), and a connection according to the defined connection type is defined for each data transmission connection in the first mobile communication network (NW1).

2. The method according to claim 1, characterized in that at least a guaranteed service quality level and a best effort quality level are defined for the first mobile communication network (NW1), wherein a connection-oriented connection is used for the data transmission connections selected for the guaranteed service quality, and a connectionless connection is used for the data transmission connections selected for the best effort quality, that at least a first and a third traffic class are defined for the second mobile communication network (NW2), that when handing over a connection from the first (NW1) to the second mobile communication network (NW2), the first traffic class is selected for the active guaranteed service data transmission connections in the second data transmission network (NW2), and the third traffic class is selected for the active best effort data transmission connections in the second data transmission network (NW2), and that when handing over a connection from the second (NW2) to the first mobile communication network (NW1), the guaranteed service quality is selected for the active data transmission connections of the first traffic class in the first data transmission network (NW1), and the best effort quality is selected for the active data transmission connections of the third traffic class in the first data transmission network (NW1).

3. The method according to claim 1, characterized in that a traffic class or a connection type is selected for the data transmission connection to be activated at least partly on the basis of the features of the information to be transmitted, such as transmission rate, delay and error probability.

4. The method according to claim 1, characterized in that for the first mobile communication network (NW1), also a controlled load service quality is also defined, for which a packet-format connection is used in selected data transmission connections, and that for the second mobile communication network (NW2), also a second and a fourth traffic class are defined.

5. The method according to claim 1, characterized in that for data transmission connections requiring real-time data transmission, a connection-oriented connection (HSCSD) is selected as the connection type in the first mobile communication network (NW1), and the first or the second traffic class in the second mobile communication network (NW2).

6. The method according to claim 1, characterized in that the connection-oriented connection of the first mobile communication network (NW1) is either a transparent connection for which transmission resources are allocated in the first mobile communication network (NW1) in such a way that the connection has a substantially fixed data transmission rate and a fixed propagation delay, or a non-transparent connection whose allocated transmission resources can be changed during the connection in such a way that the data transmission rate and/or the propagation delay can be substantially altered.

7. The method according to claim 1, characterized in that the first mobile communication network (NW1 ) is a GSM cellular network, and the second mobile communication network (NW2) is a UMTS cellular network.

8. The method according to claim 7, characterized in that the connection-oriented connection is a high-speed circuit-switched connection (HSCSD), and the connectionless connection is a packet-switched connection (GPRS).

9. A communication system, which comprises at least a first (NW1) and a second mobile communication network (NW2), a wireless terminal, means (GGSN, GWMSC) for activating at least one data transmission connection in order to transmit information between the wireless terminal (MS1) and one said mobile communication network (NW1, NW2), and means (GGSN, GWMSC) for handing over a connection between the first (NW1) and the second (NW2) mobile communication network in the wireless terminal (MS1), the first mobile communication network (NW1) comprising means (GGSN, MSC) for establishing a connection as a connection-oriented connection and/or as a connectionless connection, and at least two traffic classes being defined in the second mobile communication network (NW2) for the data transmission connections, characterized in that the communication system also comprises:

means for examining the active connections between the wireless terminal (MS1) and the mobile communication network (NW1, NW2) handing over the connection, means for handing over the connection comprising:

means for examining the connection type of the active data transmission connections in the first mobile communication network (NW1), means for defining a traffic class corresponding to each active connection type of the data transmission in the second mobile communication network (NW2), and means for establishing a connection according to the traffic class defined for each data transmission connection in the second mobile communication network (NW2), and means for examining the traffic class of the active data transmission connections in the second mobile communication network (NW2), means for defining a connection type corresponding to each active traffic class of the data transmission connection in the first mobile communication network (NW1), and means for establishing a connection according to the defined connection type for each data transmission connection in the first mobile communication network (NW1).

10. A wireless terminal (MS1) comprising means for attaching to a communication system, which contains means (RAN, BSS) for establishing a data transmission connection at least to a first (NW1) and to a second mobile communication network (NW2), which first mobile communication network (NW1) comprises means (GGSN, MSC) for establishing a connection as a connection-oriented connection and/or as a connectionless connection, and in the second mobile communication network (NW2), at least two traffic classes are defined for data transmission connections, characterized in that the wireless terminal (MS1) also comprises:

means for examining the active connections between the wireless terminal (MS1) and the mobile communication network (NW1, NW2) handing over the connection, means for handing over the connection comprising:
means for examining the connection type of the active data transmission connections in the first mobile communication network (NW1), means for defining a traffic class corresponding to each active connection type of the data transmission in the second mobile communication network (NW2), and means for establishing a connection according to the traffic class defined for each data transmission connection in the second mobile communication network (NW2), and means for examining the traffic class of the active data transmission connections in the second mobile communication network (NW2), means for defining a connection type corresponding to each active traffic class of the data transmission connection in the first mobile communication network (NW1), and means for establishing a connection according to the defined connection type for each data transmission connection in the first mobile communication network (NW1).

* * * * *